(12) United States Patent
Knudson, Jr. et al.

(10) Patent No.: US 6,849,680 B2
(45) Date of Patent: Feb. 1, 2005

US006849680B2

(54) PREPARATION OF POLYMER NANOCOMPOSITES BY DISPERSION DESTABILIZATION

(75) Inventors: Milburn I. Knudson, Jr., Gonzales, TX (US); Clois E. Powell, Seguin, TX (US)

(73) Assignee: Southern Clay Products, Inc., Gonzales, TX (US)

( * ) Notice: Subject to any disclaimer, the term of this patent is extended or adjusted under 35 U.S.C. 154(b) by 0 days.

(21) Appl. No.: 10/086,173

(22) Filed: Feb. 28, 2002

(65) Prior Publication Data

US 2002/0165305 A1 Nov. 7, 2002

Related U.S. Application Data

(60) Provisional application No. 60/273,271, filed on Mar. 2, 2001.

(51) Int. Cl.$^7$ ................................................. C08K 3/34
(52) U.S. Cl. ................. 524/445; 524/186; 524/446; 524/450; 501/145; 501/148
(58) Field of Search ................................. 524/186, 445, 524/446, 447, 448, 450, 436

(56) References Cited

U.S. PATENT DOCUMENTS

| | | |
|---|---|---|
| 2,367,384 A | 1/1945 | Tymstra |
| 2,531,396 A | 11/1950 | Carter et al. |
| 2,531,427 A | 11/1950 | Hauser |
| 2,531,440 A | 11/1950 | Jordan |
| 2,531,812 A | 11/1950 | Hauser |
| 2,552,775 A | 5/1951 | Fischer et al. |
| 2,622,987 A | 12/1952 | Ratcliffe |
| 2,658,869 A | 11/1953 | Stross et al. |
| 2,739,067 A | 3/1956 | Ratcliffe |
| 2,750,296 A | 6/1956 | Curado et al. |
| 2,754,219 A | 7/1956 | Voet et al. |
| 2,767,177 A | 10/1956 | Erickson |
| 2,795,545 A | 6/1957 | Gluesenkamp |
| 2,883,356 A | 4/1959 | Gluesenkamp |
| 2,966,506 A | 12/1960 | Jordan |
| 3,027,322 A | 3/1962 | Stuchell et al. |
| 3,084,117 A | 4/1963 | Nahin et al. |
| 3,125,547 A | 3/1964 | Blatz |
| 3,136,819 A | 6/1964 | Shapiro et al. |
| 3,471,439 A | 10/1969 | Bixler et al. |
| 3,537,994 A | 11/1970 | House |
| 3,567,680 A | 3/1971 | Iannicelli |
| 3,671,190 A | 6/1972 | Neumann |
| 3,691,070 A | 9/1972 | Pippen |
| 3,764,456 A | 10/1973 | Woodhams |
| 3,804,656 A | 4/1974 | Kaliski et al. |
| 3,839,389 A | 10/1974 | Neuman |
| 3,843,591 A | 10/1974 | Hedrick et al. |
| 3,915,867 A | 10/1975 | Kang et al. |
| 3,951,850 A | 4/1976 | Clocker et al. |
| 3,974,125 A | 8/1976 | Oswald et al. |
| 3,977,894 A | 8/1976 | White et al. |
| 3,988,287 A | 10/1976 | Inokuchi et al. |
| 4,040,974 A | 8/1977 | Wright et al. |
| 4,049,780 A | 9/1977 | Neumann |
| 4,053,493 A | 10/1977 | Oswald |
| 4,060,518 A | 11/1977 | Jeserich et al. |
| 4,081,496 A | 3/1978 | Finlayson |
| 4,087,365 A | 5/1978 | Clem |
| 4,105,578 A | 8/1978 | Finlayson et al. |
| 4,116,866 A | 9/1978 | Finlayson |
| 4,216,135 A | 8/1980 | Finlayson |
| 4,240,951 A | 12/1980 | Moll, Jr. et al. |
| 4,251,576 A | 2/1981 | Osborn et al. |
| 4,290,935 A | 9/1981 | Muraki |
| 4,291,154 A | 9/1981 | Blount |
| 4,314,919 A | 2/1982 | Washabaugh et al. |
| 4,314,929 A | 2/1982 | Mahoney, Jr. |
| 4,315,828 A | 2/1982 | Church |
| 4,339,391 A | 7/1982 | Hoffmann et al. |
| 4,341,565 A | 7/1982 | Martenson |
| 4,349,389 A | 9/1982 | Schofield |
| 4,365,030 A | 12/1982 | Oswald et al. |
| 4,382,868 A | 5/1983 | House |
| 4,386,010 A | 5/1983 | Hildebrandt |
| 4,391,637 A | 7/1983 | Mardis et al. |
| 4,410,364 A | 10/1983 | Finlayson et al. |
| 4,412,018 A | 10/1983 | Finlayson et al. |
| 4,431,755 A | 2/1984 | Weber et al. |
| 4,434,075 A | 2/1984 | Mardis et al. |
| 4,434,076 A | 2/1984 | Mardis et al. |
| 4,444,714 A | 4/1984 | Marenson |
| 4,450,095 A | 5/1984 | Finlayson |
| 4,454,237 A | 6/1984 | Hoda et al. |
| 4,455,382 A | 6/1984 | Wu |
| 4,462,470 A | 7/1984 | Alexander et al. |
| 4,464,274 A | 8/1984 | House |
| 4,465,542 A | 8/1984 | Furihata |
| 4,470,912 A | 9/1984 | Beall |
| 4,472,538 A | 9/1984 | Kamigaito et al. |
| 4,473,477 A | 9/1984 | Beall |

(List continued on next page.)

FOREIGN PATENT DOCUMENTS

| | | |
|---|---|---|
| CN | 1238353 | 12/1999 |
| DE | 3 434983 | 9/1984 |
| DE | 19726278 | 6/1997 |

(List continued on next page.)

OTHER PUBLICATIONS

Oriakhi et al., "Poly(pyrrole) and Poly(thiophene)/Clay Nonocomposites via Latex–colloid Interaction" Materials Research Bulletin, 1995, 30, pp. 723–279.
International Search Report published Sep. 17, 2002.

Primary Examiner—Katarzyna Wyrozebski
(74) Attorney, Agent, or Firm—Meyertons, Hood, Kivlin, Kowert & Goetzel, P.C.; Eric B. Meyertons

(57) ABSTRACT

Nanocomposites may be produced by mixing dispersions of polymers and dispersions of clay minerals. After mixing, the dispersions may be destabilized with the addition of appropriate compounds. The flocculated solid material exhibits characteristics of a nanocomposite, such as exfoliation of the clay mineral platelets as indicated by x-ray diffraction analysis.

60 Claims, No Drawings

U.S. PATENT DOCUMENTS

| | | |
|---|---|---|
| 4,473,675 A | 9/1984 | Knudson, Jr. et al. |
| 4,480,060 A | 10/1984 | Hoda et al. |
| 4,500,668 A | 2/1985 | Shimizu et al. |
| 4,508,628 A | 4/1985 | Walker et al. |
| 4,517,094 A | 5/1985 | Beall |
| 4,528,104 A | 7/1985 | House et al. |
| 4,528,304 A | 7/1985 | Yoshimura et al. |
| 4,549,966 A | 10/1985 | Beal |
| 4,552,712 A | 11/1985 | Ramamurthy |
| 4,558,075 A | 12/1985 | Suss et al. |
| 4,569,923 A | 2/1986 | Knudson, Jr. et al. |
| 4,600,515 A | 7/1986 | Gleason et al. |
| 4,620,993 A | 11/1986 | Suss et al. |
| 4,623,398 A | 11/1986 | Goodman et al. |
| 4,631,091 A | 12/1986 | Goodman et al. |
| 4,640,716 A | 2/1987 | Cleland |
| 4,659,760 A | 4/1987 | van der Meer |
| 4,664,842 A | 5/1987 | Knudson, Jr. et al. |
| 4,690,868 A | 9/1987 | Rice |
| 4,695,402 A | 9/1987 | Finlayson et al. |
| 4,724,098 A | 2/1988 | Kalz et al. |
| 4,739,007 A | 4/1988 | Okada et al. |
| 4,743,305 A | 5/1988 | Doidge et al. |
| 4,743,306 A | 5/1988 | Jepson et al. |
| 4,753,974 A | 6/1988 | Goodman et al. |
| 4,775,586 A | 10/1988 | Bohrn et al. |
| 4,786,558 A | 11/1988 | Sumiya et al. |
| 4,804,703 A | 2/1989 | Subramanian |
| 4,810,734 A | 3/1989 | Kawasumi et al. |
| 4,876,030 A | 10/1989 | Dixon et al. |
| 4,889,885 A | 12/1989 | Usuki et al. |
| 4,990,405 A | 2/1991 | Bohrn et al. |
| 5,061,744 A | 10/1991 | Ogitani et al. |
| 5,089,200 A | 2/1992 | Chapman, Jr. et al. |
| 5,110,501 A | 5/1992 | Knudson, Jr. et al. |
| 5,151,155 A | 9/1992 | Cody et al. |
| 5,160,454 A | 11/1992 | Knudson, Jr. et al. |
| 5,164,433 A | 11/1992 | Ricci et al. |
| 5,164,440 A | 11/1992 | Deguchi et al. |
| 5,164,460 A | 11/1992 | Yano et al. |
| 5,248,641 A | 9/1993 | Bauer et al. |
| 5,248,720 A | 9/1993 | Deguchi et al. |
| 5,310,775 A | 5/1994 | Sibilia et al. |
| 5,334,241 A | 8/1994 | Jordan |
| 5,376,604 A | 12/1994 | Iwasaki et al. |
| 5,385,776 A | 1/1995 | Maxfield et al. |
| 5,391,228 A | 2/1995 | Carrol |
| 5,464,472 A | 11/1995 | Horn et al. |
| 5,514,734 A | 5/1996 | Maxfield et al. |
| 5,552,469 A | 9/1996 | Beall et al. |
| 5,574,179 A | 11/1996 | Wahl et al. |
| 5,576,257 A | 11/1996 | Jordan |
| 5,578,672 A | 11/1996 | Beall et al. |
| 5,616,286 A | 4/1997 | Jordan |
| 5,663,111 A | 9/1997 | Gadberry et al. |
| 5,700,319 A | 12/1997 | Bauer et al. |
| 5,718,841 A | 2/1998 | Mardis et al. |
| 5,728,764 A | 3/1998 | Bauer et al. |
| 5,735,943 A | 4/1998 | Cody et al. |
| 5,739,087 A | 4/1998 | Dennis |
| 5,747,560 A | 5/1998 | Christiani et al. |
| 5,780,376 A | 7/1998 | Gonzales et al. |
| 5,785,749 A | 7/1998 | Knesek et al. |
| 5,786,417 A | 7/1998 | Ogawa et al. |
| 5,837,654 A | 11/1998 | Carroll et al. |
| 5,882,662 A | 3/1999 | Pahlck et al. |
| 5,883,173 A | 3/1999 | Elspass et al. |
| 5,900,309 A | 5/1999 | Kitamura et al. |
| 5,916,863 A | 6/1999 | Iacobucci et al. |
| 5,919,863 A | 7/1999 | Seppanen |
| 5,955,535 A | 9/1999 | Vaia |
| 5,962,553 A | 10/1999 | Ellsworth |
| 5,969,029 A | 10/1999 | Kotani et al. |
| 5,989,331 A | 11/1999 | Bauer et al. |
| 6,034,163 A | 3/2000 | Barbee et al. |
| 6,036,765 A | 3/2000 | Farrow et al. |
| 6,037,315 A | 3/2000 | Franklin et al. |
| 6,060,549 A | 5/2000 | Li et al. |
| 6,074,474 A | 6/2000 | Broome et al. |
| 6,084,019 A | 7/2000 | Matayabas, Jr. et al. |
| 6,087,016 A | 7/2000 | Feeney et al. |
| 6,113,891 A | 9/2000 | Burdick et al. |
| 6,124,245 A | 9/2000 | Patel et al. |
| 6,133,374 A | 10/2000 | Nam et al. |
| 6,136,241 A | 10/2000 | Gauckler et al. |
| 6,147,151 A | 11/2000 | Fukumoto et al. |
| 6,162,857 A | 12/2000 | Trexler, Jr. et al. |
| 6,187,719 B1 | 2/2001 | Dino et al. |
| 6,221,831 B1 | 4/2001 | Emery |
| 6,271,298 B1 * | 8/2001 | Powell ..................... 524/445 |
| 6,287,634 B1 | 9/2001 | Beall et al. |
| 6,380,295 B1 * | 4/2002 | Ross et al. ............... 524/443 |
| 6,407,155 B1 | 6/2002 | Qian et al. |
| 6,521,678 B1 * | 2/2003 | Chaiko ..................... 523/333 |
| 2001/0056149 A1 | 12/2001 | Powell |
| 2002/0002230 A1 | 1/2002 | Farrow et al. |
| 2003/0032710 A1 * | 2/2003 | Larson ..................... 524/445 |

FOREIGN PATENT DOCUMENTS

| | | |
|---|---|---|
| EP | 0 221 225 | 5/1987 |
| EP | 0 315 987 | 5/1989 |
| EP | 0 024 240 | 5/1990 |
| EP | 0 304 782 | 12/1993 |
| EP | 0787767 | 8/1997 |
| EP | 0 798 267 | 10/1997 |
| EP | 0 614 445 | 8/1998 |
| EP | 0 952 187 | 10/1999 |
| EP | 1 055 706 | 11/2000 |
| EP | 1 090 954 | 4/2001 |
| EP | 0 747322 | 9/2001 |
| GB | 920797 | 3/1963 |
| GB | 1054111 | 1/1967 |
| GB | 1213122 | 11/1970 |
| GB | 1432770 | 11/1972 |
| GB | 1439828 | 6/1976 |
| GB | 2 158 053 | 11/1985 |
| JP | 76-109998 | 9/1976 |
| JP | 252426 | 11/1987 |
| JP | 172741 | 6/1994 |
| JP | 207134 | 8/1995 |
| JP | 07228762 | 8/1995 |
| JP | 08012881 | 1/1996 |
| JP | 09194724 | 1/1996 |
| JP | 08053572 | 2/1996 |
| JP | 08259846 | 10/1996 |
| JP | 09067521 | 3/1997 |
| JP | 09087096 | 3/1997 |
| JP | 09132695 | 5/1997 |
| JP | 09175817 | 7/1997 |
| JP | 09202843 | 8/1997 |
| JP | 09225991 | 9/1997 |
| JP | 09227778 | 9/1997 |
| JP | HEI 8 81785 | 3/1998 |
| JP | 11071509 | 3/1999 |
| JP | 200086234 | 3/2000 |
| WO | 83/01208 | 4/1983 |
| WO | 92/19693 | 11/1992 |
| WO | 93/04117 | 3/1993 |
| WO | 93/04118 | 3/1993 |
| WO | 93/11190 | 6/1993 |
| WO | 97/00910 | 1/1997 |

| WO | 97/17398 | 5/1997 |
| WO | 97/27155 | 7/1997 |
| WO | 97/30950 | 8/1997 |
| WO | 97/42279 | 11/1997 |
| WO | 98/53000 | 11/1998 |
| WO | 98/56561 | 12/1998 |
| WO | 98/56598 | 12/1998 |
| WO | 01/46071 | 6/2001 |

* cited by examiner

PREPARATION OF POLYMER NANOCOMPOSITES BY DISPERSION DESTABILIZATION

This application claims priority to U.S. Provisional Patent Application No. 60/273,271 filed on Mar. 2, 2001 entitled "Preparation of Polymer Nanocomposites by Dispersion Destabilization."

BACKGROUND OF THE INVENTION

1. Field of the Invention

The present invention generally relates to a polymer nanocomposite. More particularly, the invention relates to a polymer nanocomposite formed from a mixture of a clay dispersion with a polymer dispersion.

2. Description of the Relevant Art

There has been considerable interest in forming nanocomposites especially by addition of clay minerals into polymeric materials. Clay minerals such as montmorillonite are composed of silicate layers with a thickness of about 1 nanometer.

Incorporation of such layered materials in polymers result in products which may frequently be referred to as nanocomposites. Incorporating clay minerals in a polymer matrix, however, may not always be a straightforward process. Incorporating clay minerals may require additional manufacturing steps or additional capital equipment costs, especially if melt processing may be required. Some have tried to improve the process of forming nanocomposites by increasing the compatibility between the clay minerals and the organic polymers. Thus, it has been proposed to use lipophilic compounds, such as onium compounds, to treat the clay minerals to increase the compatibility of the clay minerals in a polymer as shown in U.S. Pat. No. 4,889,885, to Usuki et al. and U.S. Pat. No. 4,810,734 to Kawasumi et al, both of which are incorporated herein by reference.

Another proposed method to improve incorporation of clay minerals into polymers is the use of emulsion polymerization. A dispersion is produced having a layered silicate, a monomer, and a polymerization initiator. The monomer is polymerized to form the latex. This polymerization process results in a latex containing a layered material intercalated with a polymer. This method is disclosed in U.S. Pat. No. 5,883,173 to Elspass et al., which is incorporated herein by reference. However, the approaches to preparing nanocomposites, whether by melt processing, ionic additions, or emulsion polymerization, may prove difficult in controlling exfoliation and polymer molecular weight. Efficiency in emulsion polymerization may also be difficult to achieve.

SUMMARY OF THE INVENTION

In an embodiment, a clay mineral, such as, but not limited to smectite clay minerals, may be intercalated with a polymer by mixing a dispersion of a polymer in a liquid carrier and a dispersion of a clay mineral in a liquid carrier to form a dispersion mixture. The dispersion mixture may be treated with a flocculating agent. A dispersion of polymer in a liquid carrier may be prepared by any of the means available to those skilled in the art. In an embodiment, the polymeric dispersion may be formulated by mixing a combination of a liquid carrier, a surfactant, and a polymer. In an embodiment, a clay mineral dispersion may be produced by mixing a clay mineral with a liquid carrier such that the clay mineral is dispersed in the liquid carrier. A surfactant may be added when preparing a dispersion of a clay mineral in the liquid carrier. The two dispersions may be subsequently mixed together to produce a dispersion mixture of the polymer and the clay mineral. The dispersion mixture may then be flocculated by addition of a flocculating agent. Examples of flocculating agents may be, but are not limited to, inorganic salts, double-layered metal hydroxides, quaternary onium compounds, or an onium saturated clay mineral. An onium saturated clay mineral may be defined as a clay mineral that has been treated with a quaternary onium compound added in excess of that required to meet the Cation Exchange Capacity (CEC) of the clay mineral. In an embodiment, a non-layered clay mineral may be substituted in the aforementioned compositions in place of a layered clay mineral.

The flocculated nanocomposite material may be separated from the liquid carrier using techniques such as, but not limited to, filtration, centrifugation, or evaporation. The nanocomposite may be formulated, compounded, and processed for use in applications such as, but not limited to, plastic engineered parts, film, and fiber as well as rubber articles such as tires, belts, and hoses.

The following terms are used throughout:

Flocculation as defined herein is the aggregation of colloidal particles suspended in water.

Intercalation as defined herein is the movement of polymer between smectite layers, where the layers are separated, but the ordered relationship between the layers is maintained. In pure examples of intercalation, the interlayer spacing can be measured by X-ray diffraction.

Exfoliation as defined herein is the movement of polymer between the smectite layers, where the layers are separated and the ordered relationship between the layers is lost. In completely exfoliated examples, no X-ray diffraction results from the interlayer separations.

Nanocomposite as defined herein is a composition comprising layered inorganic particles in a polymer matrix.

DETAILED DESCRIPTION OF THE INVENTION

In an embodiment, a polymer dispersion may be prepared by dispersion of a polymer within a liquid carrier. The polymer dispersion may be prepared by adding an amount of polymer, up to about 80% by weight of polymer, to the liquid carrier. The liquid carrier may be either water, an organic solvent, or mixtures thereof. Polymers that may be used include, but are not limited to, the following examples: polyester, polyurethane, polyvinyl chloride, styrene-butadiene, acrylic rubber, chlorosulfonated polyethylene rubber, fluoroelastomer, polyisoprene, polycarbonate resin, polyamide resin, polyolefin resin, thermoplastic resin or mixtures thereof. The polymer dispersion may be subjecting to a shearing process to fully disperse the polymeric material within the liquid carrier.

A clay mineral dispersion may be prepared by adding from about 1% to about 10% by weight of a clay mineral to a liquid carrier. The liquid carrier may be either water, an organic solvent, or mixtures thereof. The clay mineral used may be naturally occurring or synthetic. Positively charged or negatively charged minerals may be used. Representative examples of negatively charged clay minerals useful in accordance with an embodiment may be as follows:

Montmorillonite

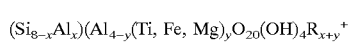

where $0 \leq x \leq 0.4$; $0.55 \leq y \leq 1.10$ and R is selected from the group consisting of $Na^+$, $Li^+$, $NH_4^+$, and mixtures thereof;

Hectorite $$(Mg_{6-x}Li_x)Si_8O_{20}(OH, F)_4R_x^+$$

where $0.57 \leq x \leq 1.15$; and R is selected from the group consisting of $Na^+$, $Li^+$, $NH_4^+$, and mixtures thereof;

Saponite $$(Si_{8-x}Al_x)(Mg, Fe)_6O_{20}(OH)_4R^+$$

where $0.58 \leq x \leq 1.84$; and R is selected from the group consisting of $Na^+$, $Li^+$, $NH_4^+$, and mixtures thereof;

Stevensite $$[Mg_{6-x}Si_8O_2O(OH)_4]R_{2x}^+$$

where $0.28 \leq x \leq 0.57$; and R is selected from the group consisting of $Na^+$, $Li^+$, $NH_4^+$, and mixtures thereof.

Beidellite $$[Al_4(Si_{8-x}Al_x)O_{20}(OH)_4]R_x^+$$

where $0.55 \leq x \leq 1.10$; and R is selected from the group consisting of $Na^+$, $Li^+$, $NH_4^+$, and mixtures thereof.

Positively charged minerals may also be used. Positively charged minerals in accordance with an embodiment, may be, but are not limited to, hydrotalcite or other double-layered mineral compounds. A representative double-layered mineral compound may have the following structure:

Double-layered Metal Hydroxide $$[M(II)_{1-x}M(III)_x(OH)_2]^{x+}(A^{n-}{}_{x/n}) \cdot mH_2O$$

wherein M is a metal with either a $2^+$ or $3^+$ charge, A is an anion, which may be a carbonate, sulfate, perchlorate, halogen, nitrate, transition metal oxide, or any one of many other negatively charged ions, and values of x may lie in the range of 0.1 to 0.5.

In some embodiments, the clay mineral compound may be chosen based on the charge of the polymer used in the polymer dispersion. When a negatively charged polymer is used, a negatively charged clay mineral (e.g., montmorillonite) may be used in the clay mineral dispersion. Alternatively if a positively charged polymer is used, a positively charged clay mineral (e.g. hydrotalcite) may be used in the clay mineral dispersion.

A clay mineral dispersion may be further processed by passing the clay mineral dispersion through a high shear mixer. This shearing step may be achieved by a homogenizing mill of the type wherein high-speed fluid shear of the slurry may be produced by passing the slurry at high velocities through a narrow gap, across which a high pressure differential may be maintained. This type of action may be produced in the well-known Manton-Gaulin ("MG") device which is sometimes referred to as the "Gaulin homogenizer." A description of the Manton-Gaulin mixer may be found in U.S. Pat. No. 4,664,842 to Knudson, Jr. et al, which is incorporated herein by reference. Other shearing equipment may be used, provided sufficient shear is imparted to the system to disperse the clay mineral within the liquid carrier system.

The polymer dispersion may be mixed with the clay mineral dispersion to form a clay-polymer dispersion mixture. Sufficient shear may be added to produce a well-blended mixture. The amount of polymer dispersion and clay mineral dispersions to be mixed may vary based upon the solids contents of both the mineral dispersion and the polymer dispersion. The amount of polymer and clay mineral dispersions to be mixed may also vary based upon the amount of clay mineral to be intercalated in the polymer. The amount of polymer and clay mineral dispersions mixed may be adjusted such that the clay mineral is present in an amount of up to about 90% by weight of the final polymer product. Polymer products having a clay mineral content of up to about 30% by weigh of the polymer product are particularly useful in some applications. For use with latex and other rubber polymers, polymer products having a clay mineral content of up to about 10% by weight of the polymer product are particularly useful.

A flocculating agent may be added to flocculate the clay-polymer dispersion mixture. Up to about 10% by weight flocculating agent may be added to flocculate the clay-polymer dispersion mixture. Flocculating agents include, but are not limited to, organic salts, inorganic salts, and mineral compounds. Examples of organic salts include, but are not limited to, compounds such as quaternary ammonium compounds, phosphonium compounds, sulfonium compounds. Other organic salts include, but are not limited to, primary, secondary and tertiary amine salts. Inorganic salts include, but are not limited to, any suitable Group I or Group II main group metal cation or any suitable transition metal cation that provides sufficient ionic charge to flocculate the dispersions. Any anion that provides sufficient solubility of the inorganic compound in the liquid carrier may be used. Examples of anions include, but are not limited to, chloride, bromide, iodide, sulfate, nitrate, perchlorate, chlorate, or phosphate. Examples of inorganic salts include, but are not limited to, calcium chloride, magnesium chloride, sodium chloride, potassium chloride, or lithium chloride. Mineral compounds include, but are not limited to, hydrotalcite.

In some embodiments, flocculating agents are charged molecules. The charge of the flocculent used may be opposite the charge of the polymer. For example, latex polymers are generally negatively charged due to the typical manufacturing processes used to manufacture latex materials. It has been found that a flocculant having a positive charge (e.g., a quaternary ammonium compound or hydrotalcite) is most effective in forming the polymer nanocomposite. Alternatively, a flocculent having a negative charge (e.g., montmorillonite) is preferred for inducing flocculation of positively charged polymers.

In some embodiments, quaternary ammonium compounds described herein may be made from natural oils such as tallow, soy, coconut and palm oil. Aliphatic groups of a quaternary ammonium compound may be derived from other naturally occurring oils including various vegetable oils, such as corn oil, coconut oil, soybean oil, cottonseed oil, castor oil and the like, as well as various animal oils or fats (e.g., tallow). The aliphatic groups may be petrochemically derived from, for example, alpha olefins. Representative examples of useful branched, saturated radicals may include 12-methylstearyl and 12-ethylstearyl. Examples of useful aromatic groups, may be benzyl and substituted benzyl moieties, including benzyl and benzylic-type materials derived from benzyl halides, benzhydryl halides, trityl halides, α-halo-α-phenylalkanes wherein the alkyl chain has from 1 to 30 carbon atoms. For example, 1-halo-1-phenyloctadecane and substituted benzyl moieties, such as those derived from ortho-, meta- and para-chlorobenzyl halides, para-methoxybenzyl halides, ortho-, meta-, and para-nitrilobenzyl halides, and ortho-, meta-, and para-alkylbenzyl halides wherein the alkyl chain includes from 1 to 30 carbon atoms; and fused ring benzyl-type moieties, such as those derived from 2-halomethylnaphthalene, 9-halomethylanthracene and 9-halomethylphenanthrene, wherein the halo group includes chloro, bromo, or any other such group which may serve as a leaving group in the nucleophilic attack of the benzyl type moiety such that the nucleophile replaces the leaving group on the benzyl type moiety.

Examples of other aromatic groups may include aromatic-type substituents such as phenyl and substituted phenyl, N-alkyl and N,N-dialkyl anilines, wherein the alkyl groups may have between 1 and 30 carbon atoms; ortho-, meta-, and para-nitrophenyl, ortho-, meta- and para-alkyl phenyl, wherein the alkyl group includes between 1 and 30 carbon atoms, 2-, 3-, and 4-halophenyl wherein the halo group is defined as chloro, bromo, or iodo, and 2-, 3-, and 4-carboxyphenyl and esters thereof, where the alcohol of the ester may be derived from an alkyl alcohol, wherein the alkyl group comprises between 1 and 30 carbon atoms, aryl such as phenol, or aralkyl such as benzyl alcohols; and fused ring aryl moieties such as naphthalene, anthracene, and phenanthrene.

Examples of quaternary ammonium compounds include, but are not limited, to compounds having the following structure:

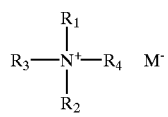

wherein $R_1$ is an alkyl group having about 12 to about 22 carbon atoms, wherein $R_2$, $R_3$ and $R_4$ are alkyl groups containing 1 to about 22 carbon atoms, aryl groups or arylalkyl groups containing 7 to about 22 carbon atoms and wherein M is chloride, bromide, iodide, nitrite, hydroxide, nitrate, sulfate, methyl sulfate, halogenated methyl groups or $C_1$ to $C_{18}$ carboxylate. The following structures are non-limiting examples of quaternary ammonium compounds:

Dimethyl dihydrogenated tallow ammonium chloride (2M2HT):

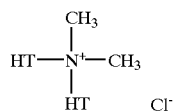

wherein HT=hydrogenated tallow;

Methyl bis[2-hydroxyethyl] stearyl ammonium chloride (M2HES):

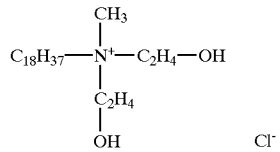

Dimethyl dibehenyl ammonium chloride;

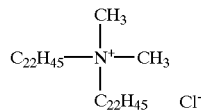

Methyl Tris[hydrogenated tallow alkyl] chloride;

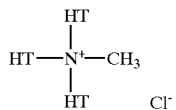

wherein HT=hydrogenated tallow.

Hydrogenated tallow alkyl(2-ethylhexyl)dimethyl ammonium methylsulfate, (Arquad ® HTL8-MS, Akzo Chemical);

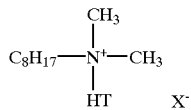

wherein HT=hydrogenated tallow, and $X^-$ is methyl sulfate.

Other non-limiting examples of alkyl quaternary ammonium salts employed for flocculating the dispersion may include alkyl quaternary ammonium salts containing the same or different straight and/or branched-chain saturated and/or unsaturated alkyl groups of about 1 to about 20 carbon atoms. The salt moiety may include chloride, bromide, methylsulfate, nitrate, hydroxide, acetate, phosphate or mixtures thereof. In some embodiments, the alkyl quaternary ammonium salts may include, but are not limited to, dimethyl di(hydrogenated tallow) ammonium chloride, methylbenzyl di(hydrogenated tallow) ammonium chloride, dimethylbenzyl hydrogenated tallow ammonium chloride, (bishydroxyethyl) methyl tallow ammonium chloride, dimethyl hydrogenated tallow-2-ethylhexyl ammonium methylsulfate, or mixtures thereof.

Examples of amine salts that may be used as a flocculant may include, but are not limited to, compounds having the following structure:

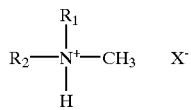

wherein $R_1$, $R_2$, and $R_3$ may be independently hydrogen, alkyl, aryl, or alkylaryl groups. The alkyl, aryl, or alkylaryl groups may include carbon moieties of about 1 to about 20 carbon atoms and X may be chloride, bromide, iodide, nitrite, nitrate, hydroxide, sulfate, sulfite, phosphate or other suitable anionic substituents.

Examples of amine compounds that may be used as the amine salts may be, but are not limited to salts of the following amines: methylamine, ethylamine, propylamine, isopropylamine, butylamine, isobutylamine, sec-butylamine, tert-butylamine, cyclohexylamine, benzylamine, aniline, p-toluidine, p-anisidine, dimethylamine, diethylamine, dipropylamine, N-methylaniline, trimethylamine, triethylamine, tripropylamine, and N,N-dimethylaniline. Further examples of amine compounds that may be used as the amine salts may be, but are not limited to, the following: dodecyl dimethyl amine, octadecyl dimethyl amine, dodecyl amine, octadecyl amine, dodecyl methyl amine, and octadecyl methyl amine.

A flocculated clay-polymer dispersion may be further processed by filtration, centrifugation, or drying. In an embodiment, the flocculated clay-polymer dispersion may be separated from the liquid carrier by filtration to form a filtercake. The filtercake may be dried to achieve reduction of the water content to less than about 50%. The nanocomposite may be further processed using rollers, mixers, or milled to break apart the filtercake. The resulting particles may be further processed into non-limiting examples such as plastic engineered parts, film, fiber, and rubber articles such as tires, belts and hoses using known processing methods.

The clay mineral may be treated with an onium compound prior to forming a mineral clay dispersion. Examples of onium compounds include, but are not limited to, quaternary ammonium compounds, phosphonium compounds and sulfonium compounds. In an embodiment a clay mineral dispersion may be prepared in the following manner. A clay mineral may be added to an aqueous carrier to produce a slurry having between about 1% by weight to about 10% by weight of clay mineral. An onium compound may be added to the slurry. The amount of onium compound may be greater than 1 and up to about 3 times the Cation Exchange Capacity (CEC) of the clay mineral. The slurry may be subjected to a high shear treatment in any number of shearing mills. One example of a shearing mill may be the Manton-Gaulin mill as previously described. After subjecting the clay mineral slurry to high shear, the resulting clay mineral dispersion may be mixed with a polymer dispersion as described before. Moderate shear may be used to achieve mixing of the two dispersions. A moderate shear may be supplied, for example, by a Cowles blender. The resulting clay-polymer dispersion may be further processed as described herein.

An onium compound (e.g., a quaternary ammonium compound) may be added in excess of that required to meet the Cation Exchange Capacity (CEC) of the clay mineral. It has been found that such compounds may not require the addition of a flocculating agent after the clay mineral dispersion is mixed with the polymer dispersion. It is believed that clay minerals treated with excess onium compounds may include a sufficient amount of onium compound such that any onium compound that is present, but not bound to the clay mineral, may serve as a flocculating agent. That is, while a portion of the onium compound is intercalated within the clay mineral, some of the excess onium compounds remains dispersed or dissolved in the liquid carrier. As opposed to the previously described embodiment, the flocculating agent, (e.g., the onium compound) is thus added prior to forming the clay-polymer dispersion, rather than after.

Mineral compounds may also be used as a flocculating agent. In an embodiment, a polymeric dispersion and a clay mineral dispersion may be prepared as previously described. The clay mineral dispersion may be added to the polymeric dispersion without causing flocculation. The polymeric dispersion/clay mineral dispersion mixture may then be contacted with about 1% to about 10% by weight of a mineral compound (e.g., hydrotalcite) to cause flocculation of the polymeric dispersion. Following flocculation, the resulting nanocomposite may be processed as described in an earlier section.

In one embodiment, the clay mineral dispersion is added to the polymer dispersion to form a clay-polymer dispersion. Alternatively, the polymer dispersion may be added to the clay dispersion to form the clay-polymer dispersion.

In an embodiment, a polymer dispersion and a clay mineral dispersion may be prepared separately as described earlier. These dispersions may be mixed with sufficient shear to produce a clay-polymer dispersion as described earlier. To the clay-polymer dispersion, with mixing, may be added an inorganic salt at about 1% to about 20% by weight of solution such that the clay-polymer dispersion may be flocculated. The produced nanocomposite may be processed as described in the previous sections.

The polymer and clay dispersions in the embodiments described herein may include a range of particle sizes. The dispersions may include finely divided particles distributed throughout a bulk substance where the particles may be the disperse or internal phase and the bulk substance may be the continuous or external phase. The polymer and clay sizes may range from about 0.05 microns to about 5.0 microns. This particle size range may produce a colloidal dispersion. Polymer and clay dispersions may be, but are not limited to, colloidal dispersions. Other dispersions with a different range of particle sizes may be included in other embodiments.

While the aforementioned embodiments used layered clay minerals in dispersions and as flocculants, non-layered clay minerals may be utilized as well. Examples of non-layered clay minerals that may be used include, but are not limited to, sepiolite or attapulgite.

X-ray diffraction may be used to determine the extent of exfoliation, or separation, of the mineral layers in the nanocomposite. In powder x-ray diffraction, the $D_{001}$ peak may be monitored and distance of the spacing between the platelets may be inferred. X-ray diffraction data may be used to determine intercalation and disorder of clay mineral particles incorporated within the polymer. Platelet spacing values may range from 1–2 Å in an untreated clay mineral. In clays where the platelets are so well separated, such as in a nanocomposite, the $D_{001}$ peak may be absent in the x-ray scan.

In some embodiments, a surfactant may be added to the polymer dispersion to aid in dispersion of the polymer. Surfactants that may be used include amphoteric, anionic, cationic, and non-ionic. A surfactant may be added in an amount from about 1% to about 20% by weight of polymer.

The nanocomposites herein described, may be mixed with other materials to produce a number of different products or articles. The nanocomposite may be formulated, for example, into automobile tires. The nanocomposite may be added to impart improved performance of the automobile tire on ice by minimizing reinforcing performance of a tread rubber, while still improving the traction force by the elimination of hydroplaning and increasing the area of contact with a road surface.

A rubber composition formed with the nanocomposites may exhibit excellent hydrophobic and water repellency properties. The rubber composition, when used in automobile tires, may reduce water deposition on the surface of the tread, thereby increasing the area of contact between a tire and road surface. U.S. Pat. No. 6,147,151 to Fukumoto, et al., which is incorporated herein by reference, further describes tire production.

Paints may also be formulated with the nanocomposites described herein to improve desirable paint characteristics such as minimized sagging, luster, durability, thixotropy, and solids suspension. The nanocomposites described herein may be used in those specialty paint formulations especially designed to paint the polymeric materials of automobile bumpers and the like. U.S. Pat. No. 6,133,374 to Nam, et al., which is incorporated herein by reference, further describes the use of nanocomposites in paint formulations.

The nanocomposites described herein may, for example, be used in melt extrusion of the nanocomposite into film. Formulation may be accomplished by feeding solid polymer to an extruder in which the polymer may be heated to a temperature above its melting point. A rotating screw pushes the polymer and the resulting viscous polymer melt through the extruder barrel into a die in which the polymer may be shaped to the desired form. The resulting extrudate may either be quenched or allowed to cool slowly to temperatures below the melting point, causing the extrudate to rigidify and assume the shape of the die orifice. For cast film, a gapped coat hanger die may be used to lay a melt of modified polymerized organic system onto a roller. The film may then be fed through a nip roller and onto a take-up roll.

Film may also be produced as a blown film by feeding the melt of the nanocomposites through an annular die, blowing air into the inside of the bubble, then collapsing the bubble and collecting on a roll-up spool. The film may be either a monolayer or multiple layer material.

In melt extrusion of polymer resins there may be flow regimes where anomalous flow behavior occurs leading to surface imperfections on the extrudate surfaces. Such imperfections, commonly called melt fractures, appear in different forms. The so-called "sharkskin" fracture may occur at lower shear rates and may appear as a finely-structured and uniform roughness. In a blown-film extrusion, sharkskin fractures may appear as an undesirable herringbone pattern, reducing clarity and giving a dull surface. At various shear rates, flow may become unpredictable such that alternating bands of glossy surface and sharkskin fracture appear. This behavior may be especially undesirable in wire coating and in tube and pipe extrusions, as well as in blown film processes.

There may be several methods for eliminating surface melt fracture under commercial film fabrication conditions. These may be aimed at reducing the shear stresses in the die and may include increasing the melt temperature, modifying the die geometry, or the use of slip additives in the resin to reduce friction at the wall. U.S. Pat. No. 3,125,547 to Blatz, U.S. Pat. No. 4,552,712 to Ramamurthy, and U.S. Pat. No. 5,089,200 to Chapman, Jr., et al., all of which are incorporated herein by reference further describe polymer film extrusion processing methods.

In production of fibers, or with injection molding or blow molding, the nanocomposites may impart favorable characteristics to those materials and processes. For example, fibers may exhibit increased tensile or flexural strength. The nanocomposites may also improve the extrusion of the fibers similar to the elimination of melt fractures in commercial films. Injection molding processes may exhibit improvements in form release and more accurate replication of the molded product to the form. Blow molding processes may exhibit improved surface structure features.

The following examples serve to illustrate methods of producing a nanocomposite by the previous embodiments. The examples should not be considered limiting.

EXAMPLE 1

To 100 g of an approximately 50% solids by weight of Good-Rite SB-0738 (a latex polymer available from B. F. Goodrich), was added, with stirring, 100 g of a 3.06% by weight aqueous clay slurry of Cloisite® (Southern Clay Products). To the stirred mixture was added 4.8 grams of hydrogenated tallow alkyl(2-ethylhexyl)dimethyl ammonium methylsulfate, (Arquad ® HTL8-MS, Akzo Chemical). The dispersion mixture flocculated, was separated from the water by filtration and the solids were dried in an oven at about 50° C. An x-ray diffraction analysis of the formed nanocomposite was run. The $D_{001}$ peak was absent indicating high exfoliation of the clay material in the polymer.

EXAMPLE 2

Example 2 was conducted as Example 1 except that Good-Rite SB-1168 (a latex polymer available from B. F. Goodrich) was utilized. The dispersion mixture flocculated. The $D_{001}$ peak was present and indicated smectite clay platelet spacing of about 36 Å.

EXAMPLE 3

Example 3 was conducted as Example 1 except that Good-Rite SB-1177 (a latex polymer available from B. F. Goodrich) was utilized. The dispersion mixture flocculated. The $D_{001}$ peak was present and indicated smectite clay platelet spacing of about 38 Å.

EXAMPLE 4

A filtercake of an organoclay was prepared in the following way. A montmorillonite clay was exchanged with hydrogenated tallow alkyl(2-ethylhexyl)dimethyl ammonium methylsulfate, (Arquad ® HTL8-MS, Akzo Chemical) at 130 MER. MER is a measure of milliequivalent ratio (MER), providing the relationship between the amount of a quaternary onium compound added to a clay based upon the cation exchange capacity of the clay. The slurry was filtered and the filtercake was processed by milling before use. The solids content of the filtercake was 47.40%. To 100 grams of Good-Rite SB-1168 was added 12.66 grams of the processed filtercake. A high speed disperser was employed for dispersion of the filtercake into Good-Rite SB-1168. The dispersion mixture flocculated. The solids were isolated and an x-ray diffraction analysis was conducted on the resulting nanocomposite. The $D_{001}$ peak was present and indicated smectite clay platelet spacing of about 28 Å.

EXAMPLE 5

A mixture of 97 g of deionized water and 3 grams of hydrotalcite were subjected to a high energy disperser. After about 5 minutes of high shear the viscosity of the solution was about 250–500 centipoise (cps). After about four hours, the viscosity increased to about that of a 3% montmorillonite slurry. The slurry was then passed through a hand pump homogenizer and the viscosity reverted back to a water thin viscosity. To 78.7 grams of the hydrotalcite dispersion was slowly added, with stirring, 60.6 grams of a 70% solids by weight of Goodyear LPF-6758 (a styrene-butadiene latex, available from Goodyear). When 26.2 grams of Goodyear LPF-6758 were added, the dispersion mixture flocculated, and the remainder of Goodyear LPF-6758 was added. A sample was prepared for x-ray diffraction. The $D_{001}$ peak was absent, indicating high exfoliation of the hydrotalcite in the polymer.

EXAMPLE 6

40 grams of the aqueous hydrotalcite dispersion described in Example 5 was slowly added to 130 grams of Goodyear LPF-6758. The dispersion mixture flocculated. The solids were prepared for x-ray diffraction analysis. The $D_{001}$ peak indicated spacing of about 39.9 Å.

EXAMPLE 7

130 grams of a 3% aqueous montmorillonite slurry was added with stirring to 100 grams of Goodyear LPF-6758. To this mixture was added, with stirring, 57.8 grams of the aqueous hydrotalcite dispersion described in Example 5. The dispersion mixture flocculated and the solids prepared for x-ray diffraction analysis. The $D_{001}$ peak was absent, indicating high exfoliation of the clay mineral in the polymer.

EXAMPLE 8

A 3% solids aqueous Cloisite® dispersion was prepared with an excess of hydrogenated tallow alkyl(2-ethylhexyl)

dimethyl ammonium methylsulfate, (Arquad ® HTL8-MS, Akzo Chemical) to produce a 125 MER organoclay. The organoclay was passed through a Manton-Gaulin homogenizer at a setting of about 4,500 psig. To 100 grams of Goodyear LPF-6758 was added, with stirring, 180.7 grams of the aqueous Cloisite® dispersion. The dispersion mixture flocculated. The solids were prepared for x-ray diffraction analysis. The $D_{001}$ peak indicated spacing of the clay platelets of about 39.2 Å.

EXAMPLE 9

A 3.06% by weight aqueous organoclay slurry was made and passed through the Manton-Gaulin homogenizer at a setting of about 4,500 psig. The organoclay was a 125 MER organoclay with hydrogenated tallow alkyl(2-ethylhexyl) dimethyl ammonium methylsulfate, (Arquad ® HTL8-MS, Akzo Chemical). To 100 grams of Goodyear LPF-6758 was added, slowly and with stirring, 181.2 grams of the organoclay dispersion. A flock formed after 3 minutes of shearing. The solids produced were prepared for x-ray diffraction analysis. The $D_{001}$ peak indicated spacing of the clay platelets of about 37.1 Å.

EXAMPLE 10

About 50 grams of the nanocomposite produced in Example 9 was fed into a Brabender mixer over a period of two minutes and mixed for an additional 5 minutes at 150° C. and at 60 rpm. The Brabender torque was measured during the mixing. The torque initially increased to about 36.1 Nm, and remained at that level during the 5 minute mixing. The material was removed and hot pressed for 5 minutes at 150° C. An x-ray diffraction analysis of the material was run. The $D_{001}$ peak was absent, indicating high exfoliation of the clay in the polymer.

EXAMPLE 11

This example is a scale-up of Example 9. To 400 grams of Goodyear LPF-6758 in a one gallon container was added, over a 5 minute period and utilizing a high speed disperser for mixing, 724 grams of the 125 MER organoclay dispersion produced in Example 9. After all of the organoclay dispersion was added, mixing was continued for an additional 3 minutes. The mixture flocculated. An x-ray diffraction analysis of the material was run. The $D_{001}$ peak indicated spacing of the clay platelets of about 39.3 Å.

EXAMPLE 12

Example 12 is a control for comparison purposes. It is an aqueous dispersion 125 MER hydrogenated tallow alkyl(2-ethylhexyl)dimethyl ammonium methylsulfate, (Arquad ® HTL8-MS, Akzo Chemical) treated montmorillonite clay. An x-ray diffraction analysis of the material was run. The $D_{001}$ peak indicated spacing of the clay platelets of about 25.6 Å.

EXAMPLE 13

Example 13 is a control for comparison purposes. It is a dry dispersion 125 MER of hydrogenated tallow alkyl(2-ethylhexyl)dimethyl ammonium methylsulfate, (Arquad ® HTL8-MS, Akzo Chemical) treated montmorillonite clay. An x-ray diffraction analysis of the material was run. The $D_{001}$ peak indicated spacing of the clay platelets of about 23.7 Å.

EXAMPLE 14

Example 14 is a dried hydrotalcite. An x-ray diffraction analysis of the material was run. The $D_{001}$ peak indicated spacing of the hydrotalcite platelets of about 8.6 Å.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

TABLE 1

Platelet Exfoliation Measured by $D_{001}$ Spacing as a Function of Polymer and Clay Mineral Utilized

| Example ID | Polymer, amount in grams and percent solids content | Clay mineral type amount in grams and percent solids content | Flocculant | $D_{001}$ Spacing in Angstroms |
|---|---|---|---|---|
| 1 | Good-Rite SB-0738 100 g 50% | Cloisite 100 g 3.06% | 4.8 g HTL8 | Absent |
| 2 | Good-Rite SB-1168 100 g 50% | Cloisite 100 g 3.06% | 4.8 g HTL8 | 36 |
| 3 | Good-Rite SB-1177 100 g 50% | Cloisite 100 g 3.06% | 4.8 g HTL8 | 38 |
| 4 | Good-Rite SB-1168 100 g 50% | 130 MER MMT 12.66 g | — | 28 |
| 5 | Goodyear LPF-6758 100 g 70% | Hydrotalcite 78.7 g 3% | — | Absent |
| 6 | Goodyear LPF-6758 130 g 70% | Hydrotalcite 40 g 3% | — | 39.9 |
| 7 | Goodyear LPF-6758 100 g 70% | MMT 130 g 3% | Hydrotalcite 57.8 g 3% hydrotalcite | Absent |
| 8 | Goodyear LPF-6758 100 g 70% | 125 MER HTL8 MMT subjected to MG 180.7 g | — | 39.2 |

TABLE 1-continued

Platelet Exfoliation Measured by $D_{001}$ Spacing as a Function of Polymer and Clay Mineral Utilized

| Example ID | Polymer, amount in grams and percent solids content | Clay mineral type amount in grams and percent solids content | Flocculant | $D_{001}$ Spacing in Angstroms |
|---|---|---|---|---|
| 9 | Goodyear LPF-6758 100 g 70% | 125 MER HTL8 MMT subjected to MG 181.2 g | — | 37.1 |
| 11 | Goodyear LPF-6758 400 g 70% | 125 MER HTL8 MMT subjected to MG 724 g | — | 39.3 |
| Controls 12 | — | 125 MER HTL8 MMT subjected to MG aqueous dispersion | — | 25.6 |
| 13 | — | Dry powder prepared by adding 125 MER HTL8 to MMT subjected to MG | — | 23.7 |
| 14 | — | Hydrotalcite | — | 8.6 |

MMT = montmorillonite
MER = milliequivalent ratio
MG = Manton-Gaulin homogenizer
HTL8 = hydrogenated tallow alkyl(2-ethylhexyl)dimethyl ammonium methylsulfate, (Arquad ® HTL8-MS, Akzo Chemical)
Note: In Example 5, the latex was added to the mineral. In all other examples, the mineral was added to the latex.

What is claimed is:

1. A method of making a polymer nanocomposite comprising:
   combining a polymer dispersion with a clay mineral dispersion to form a clay-polymer dispersion, wherein the polymer dispersion comprises a negatively charged polymer, and wherein the clay-polymer dispersion comprises less than 90% by weight of clay with respect to the weight of polymer in the clay-polymer dispersion; and
   adding a flocculating agent to the clay-polymer dispersion mixture to form the polymer nanocomposite, wherein the flocculating agent comprises a positively charged compound.

2. The method of claim 1, wherein the polymer dispersion comprises less than 80% by weight of the negatively charged polymer.

3. The method of claim 1, wherein the negatively charged polymer comprises styrene-butadiene latex.

4. The method of claim 1, wherein the negatively charged polymer comprises latex.

5. The method of claim 1, wherein the clay mineral dispersion comprises montmorillonite.

6. The method of claim 1, wherein the clay mineral dispersion comprises bentonite.

7. The method of claim 1, wherein the clay mineral dispersion comprises hectorite, saponite, attapulgite, beidellite, stevensite, sauconite, nontronite, Laponite, or sepiolite.

8. The method of claim 1, wherein the clay mineral dispersion comprises from about 1% to about 10% by weight of the clay mineral.

9. The method of claim 1, further comprising forming the clay mineral dispersion by subjecting a mixture of the clay mineral in a liquid carrier to a high shear process.

10. The method of claim 1, wherein the clay-polymer dispersion comprises less than 30% by weight of clay mineral with respect to the weight of the negatively charged polymer in the clay-polymer dispersion.

11. The method of claim 1, wherein the flocculating agent comprises a quaternary ammonium compound.

12. The method of claim 1, wherein the flocculating agent comprises a quaternary ammonium compound having the structure:

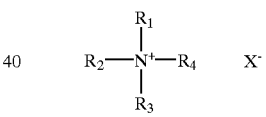

wherein $R_1$, $R_2$, $R_3$, and $R_4$ are independently alkyl groups, aryl groups or arylalkyl groups, and wherein at least one of $R_1$, $R_2$, $R_3$, or $R_4$ is an aliphatic group derived from a naturally occurring oil.

13. The method of claim 1, wherein the flocculating agent comprises between about 1% to about 10% by weight of the clay-polymer dispersion.

14. The method of claim 1, wherein the flocculating agent comprises hydrotalcite.

15. The method of claim 1, wherein the clay mineral dispersion comprises montmorillonite and wherein the flocculating agent comprises hydrotalcite.

16. A polymer nanocomposite made by the method comprising:
   combining a polymer dispersion with a clay mineral dispersion to form a clay-polymer dispersion, wherein the polymer dispersion comprises a negatively charged polymer, and wherein the clay-polymer dispersion comprises less than 90% by weight of clay with respect to the weight of polymer in the clay-polymer dispersion; and
   adding a flocculating agent to the clay-polymer dispersion mixture to form the polymer nanocomposite, wherein the flocculating agent comprises a positively charged compound.

17. The polymer nanocomposite of claim 16, wherein the polymer dispersion comprises less than 80% by weight of the negatively charged polymer.

18. The polymer nanocomposite of claim 16, wherein the negatively charged polymer comprises styrene-butadiene latex.

19. The polymer nanocomposite of claim 16, wherein the negatively charged polymer comprises latex.

20. The polymer nanocomposite of claim 16, wherein the clay mineral dispersion comprises montmorillonite.

21. The polymer nanocomposite of claim 16, wherein the clay mineral dispersion comprises bentonite.

22. The polymer nanocomposite of claim 16, wherein the clay mineral dispersion comprises hectorite, saponite, attapulgite, beidellite, stevensite, sauconite, nontronite, Laponite, or sepiolite.

23. The polymer nanocomposite of claim 16, wherein the clay mineral dispersion comprises from about 1% to about 10% by weight of the clay mineral.

24. The polymer nanocomposite of claim 16, wherein the method further comprises forming the clay mineral dispersion by subjecting a mixture of the clay mineral in a liquid carrier to a high shear process.

25. The polymer nanocomposite of claim 16, wherein the clay-polymer dispersion comprises less than 30% by weight of clay mineral with respect to the weight of the negatively charged polymer in the clay-polymer dispersion.

26. The polymer nanocomposite of claim 16, wherein the flocculating agent comprises a quaternary ammonium compound.

27. The polymer nanocomposite of claim 16, wherein the flocculating agent comprises a quaternary ammonium compound having the structure:

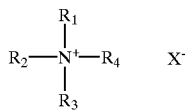

wherein $R_1$, $R_2$, $R_3$, and $R_4$ are independently alkyl groups, aryl groups or arylalkyl groups, and wherein at least one of $R_1$, $R_2$, $R_3$, or $R_4$ is an aliphatic group derived from a naturally occurring oil.

28. The polymer nanocomposite of claim 16, wherein the flocculating agent comprises between about 1% to about 10% by weight of the clay-polymer dispersion.

29. The polymer nanocomposite of claim 16, wherein the flocculating agent comprises hydrotalcite.

30. The polymer nanocomposite of claim 16, wherein the mineral clay mineral dispersion comprises montmorillonite and wherein the flocculating agent comprises hydrotalcite.

31. A method of making a polymer nanocomposite comprising:
combining a polymer dispersion with a clay mineral dispersion to form a clay-polymer dispersion; wherein the clay-polymer dispersion comprises less than 90% by weight of clay mineral with respect to the weight of the polymer in the clay-polymer dispersion; and
adding a flocculating agent to the clay-polymer dispersion mixture to form the polymer nanocomposite.

32. The method of claim 31, wherein the polymer dispersion comprises latex.

33. The method of claim 31, wherein the polymer dispersion comprises polyvinyl chloride, a chlorosulfonated polyethylene rubber, a fluoroeleastomer, or polyisoprene.

34. The method of claim 31, wherein the polymer dispersion comprises less than 80% by weight of the polymer.

35. The method of claim 31, wherein the clay mineral dispersion comprises montmorillonite.

36. The method of claim 31, wherein the clay mineral dispersion comprises bentonite.

37. The method of claim 31, wherein the clay mineral dispersion comprises hectorite, saponite, attapulgite, beidellite, stevensite, sauconite, nontronite, Laponite, or sepiolite.

38. The method of claim 31, wherein the clay mineral dispersion comprises hydrotalcite.

39. The method of claim 31, wherein the clay mineral dispersion comprises from about 1% to about 10% by weight of the clay mineral.

40. The method of claim 31, further comprising forming the clay mineral dispersion by subjecting a mixture of the clay mineral in a liquid carrier to a high shear process.

41. The method of claim 31, wherein the clay-polymer dispersion comprises less than 30% by weight of clay mineral with respect to the weight of polymer in the clay-polymer dispersion.

42. The method of claim 31, wherein the flocculating agent comprises a quaternary ammonium compound.

43. The method of claim 31, wherein the flocculating agent comprises a quaternary ammonium compound having the structure:

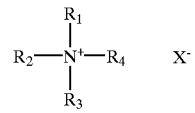

wherein $R_1$, $R_2$, $R_3$, and $R_4$ are independently alkyl groups, aryl groups or arylalkyl groups, and wherein at least one of $R_1$, $R_2$, $R_3$, or $R_4$ is an aliphatic group derived from a naturally occurring oil.

44. The method of claim 31, wherein the flocculating agent comprises between about 1% to about 10% by weight of the clay-polymer dispersion.

45. The method of claim 31, wherein the flocculating agent comprises hydrotalcite.

46. A polymer nanocomposite made by a method comprising:
combining a polymer dispersion with a clay mineral dispersion to form a clay-polymer dispersion; wherein the clay-polymer dispersion comprises less than 90% by weight of clay mineral with respect to the weight of the polymer in the clay-polymer dispersion; and
adding a flocculating agent to the clay-polymer dispersion mixture to form the polymer nanocomposite.

47. The polymer nanocomposite of claim 46, wherein the polymer dispersion comprises latex.

48. The polymer nanocomposite of claim 46, wherein the polymer dispersion comprises polyvinyl chloride, a chlorosulfonated polyethylene rubber, a fluoroeleastomer, or polyisoprene.

49. The polymer nanocomposite of claim 46, wherein the polymer dispersion comprises less than 80% by weight of the polymer.

50. The polymer nanocomposite of claim 46, wherein the clay mineral dispersion comprises montmorillonite.

51. The polymer nanocomposite of claim 46, wherein the clay mineral dispersion comprises bentonite.

52. The polymer nanocomposite of claim 46, wherein the clay mineral dispersion comprises hectorite, saponite, attapulgite, beidellite, stevensite, sauconite, nontronite, Laponite, or sepiolite.

53. The polymer nanocomposite of claim 46, wherein the clay mineral dispersion comprises hydrotalcite.

54. The polymer nanocomposite of claim 46, wherein the clay mineral dispersion comprises from about 1% to about 10% by weight of the clay mineral.

55. The polymer nanocomposite of claim 46, further comprising forming the clay mineral dispersion by subjecting a mixture of the clay mineral in a liquid carrier to a high shear process.

56. The polymer nanocomposite of claim 46, wherein the clay-polymer dispersion comprises less than 30% by weight of clay mineral with respect to the weight of polymer in the clay-polymer dispersion.

57. The polymer nanocomposite of claim 46, wherein the flocculating agent comprises a quaternary ammonium compound.

58. The polymer nanocomposite of claim 46, wherein the flocculating agent comprises a quaternary ammonia compound having the structure:

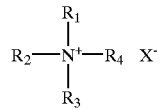

wherein $R_1$, $R_2$, $R_3$, and $R_4$ are independently alkyl groups, aryl groups or arylalkyl groups, and wherein at least one of $R_1$, $R_2$, $R_3$, or $R_4$ is an aliphatic group derived from a naturally occurring oil.

59. The polymer nanocomposite of claim 46, wherein the flocculating agent comprises between about 1% to about 10% by weight of the clay-polymer dispersion.

60. The polymer nanocomposite of claim 46, wherein the flocculating agent comprises hydrotalcite.

* * * * *